United States Patent [19]

Hilton

[11] 4,285,162

[45] Aug. 25, 1981

[54] HORTICULTURAL ENCLOSURES

[75] Inventor: William J. Hilton, Ashby-de-la-Zouch, England

[73] Assignee: Bonas Brothers Limited, Staffordshire, England

[21] Appl. No.: 137,575

[22] Filed: Apr. 7, 1980

[30] Foreign Application Priority Data

Apr. 7, 1979 [GB] United Kingdom ............... 12307/79
Oct. 20, 1979 [GB] United Kingdom ............... 36472/79

[51] Int. Cl.³ .............................................. A01G 13/04
[52] U.S. Cl. .......................................... 47/29; 47/27
[58] Field of Search ...................... 47/26–30, 47/17, 19

[56] References Cited

U.S. PATENT DOCUMENTS 2,300,776  11/1942  Collins ................................ 47/28 X
3,698,131  10/1972  Kesinger .............................. 47/29

FOREIGN PATENT DOCUMENTS 2714059  10/1978  Fed. Rep. of Germany ............ 47/27
1512100  12/1967  France .................................... 47/29
1243419   8/1971  United Kingdom ..................... 47/29

Primary Examiner—Robert E. Bagwill
Attorney, Agent, or Firm—James E. Nilles

[57] ABSTRACT

A horticultural enclosure having a tubular frame and a cover having pockets by which it is fitted on the frame, with sufficient tension so that flaps in the cover will open to admit rain to the enclosure and will also open under the weight of condensed water to admit air to the enclosure.

17 Claims, 6 Drawing Figures

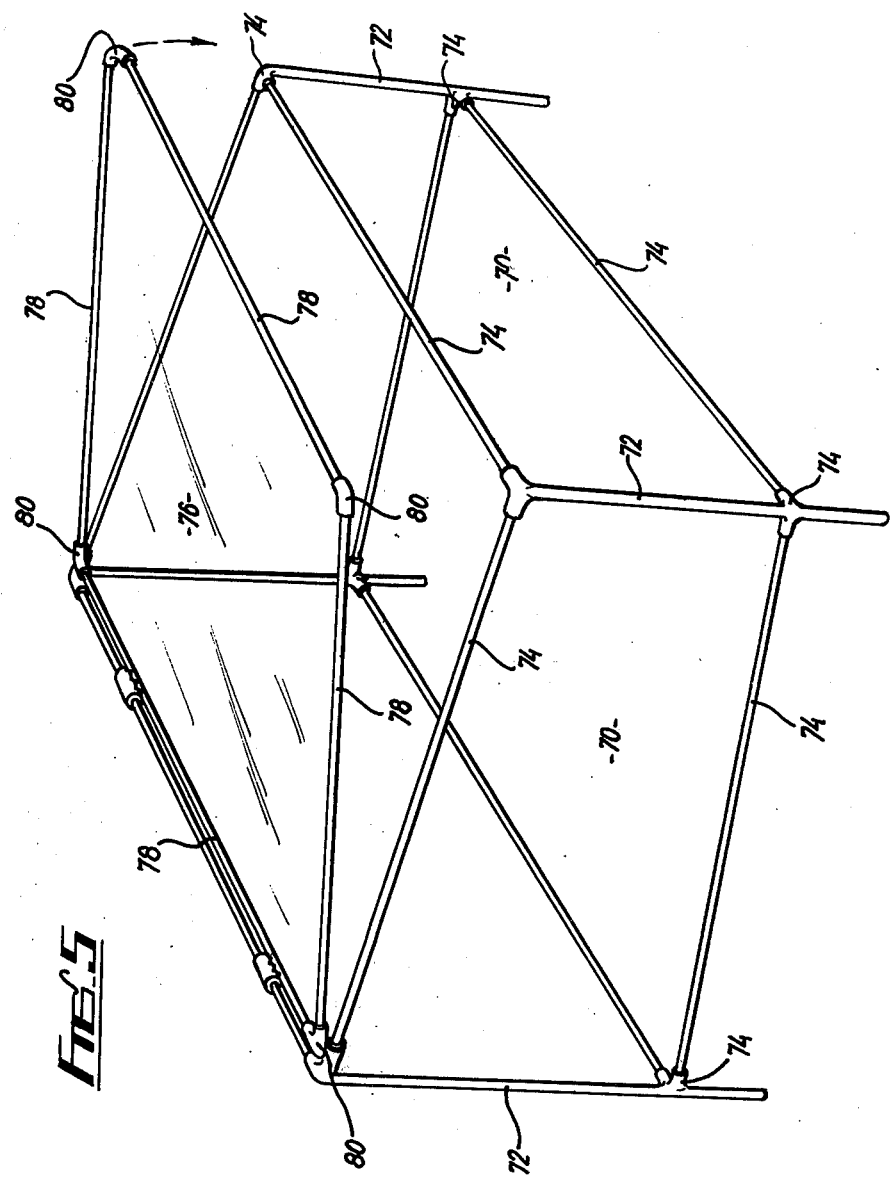

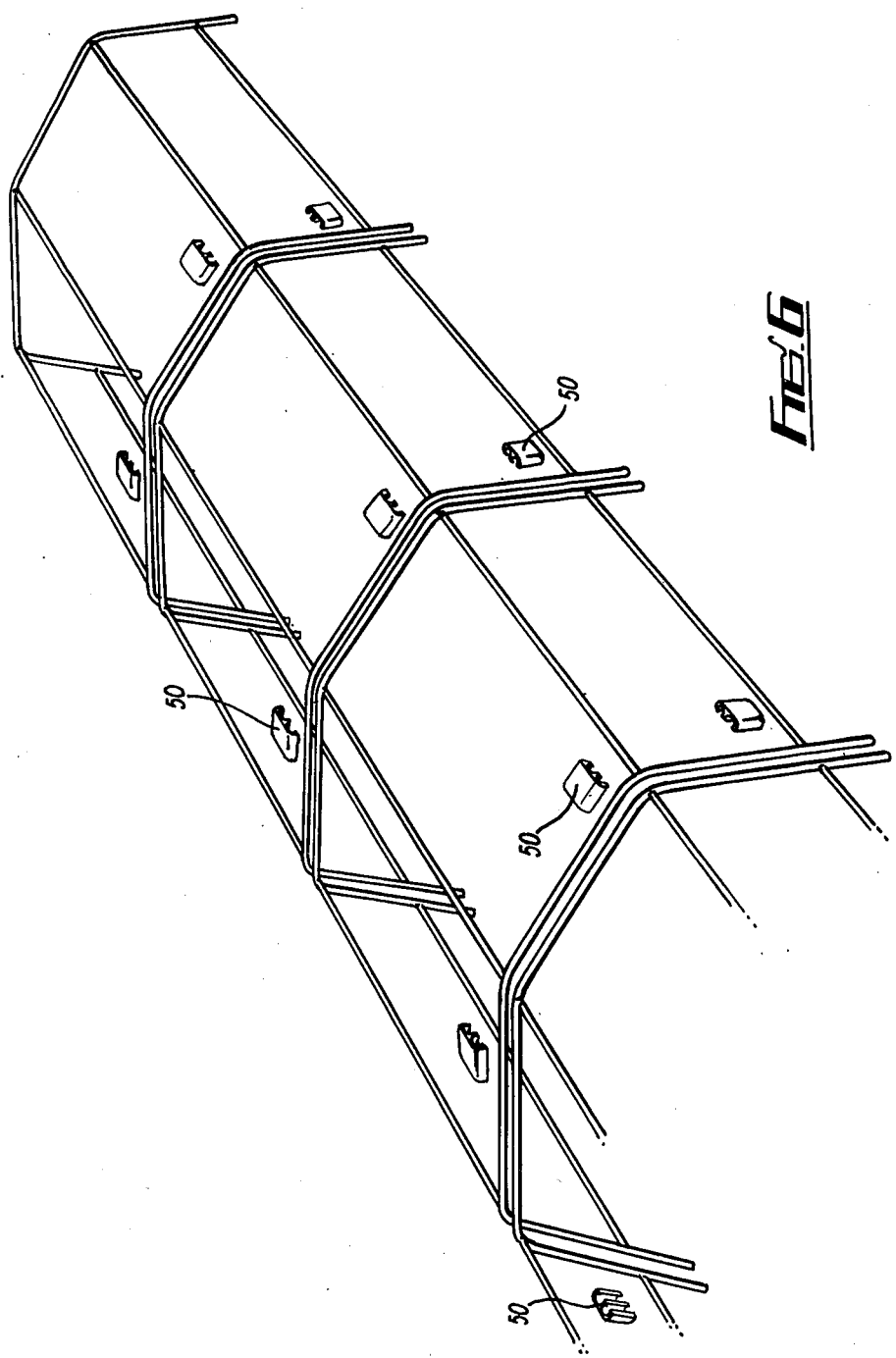

HORTICULTURAL ENCLOSURES

This invention relates to a horticultural enclosure and more particularly, but not exclusively, a cloche.

The use of horticultural enclosures such as cloches to accelerate plant growth is well known. Recently use of cloches arranged to form a continuous cover for "strip cropping" has been advocated as a means of forcing plants. Such a method of cultivation requires a cloche which is cheap, easy to erect and move and which is capable of admitting air to the plant enclosed thereby, adequate ventilation of plants being a pre-requisite for good growth. There are already available cloches which can be manually adjusted to admit air. The professional grower may be employing many hundreds of cloches, however, and frequent manual adjustment of them would require immense labour.

It is also necessary that plants enclosed by cloches receive an adequate water supply. At present professional growers rely upon the capillary action of the soil to bring water from outside the cloche to the soil within it since that avoids having to move each cloche to water the plants and enables normal irrigation equipment to be used. Such capillary action is entirely dependent on the soil under the cloche being moist. Once the soil under the cloche dries out the capillary action stops and no amount of wetting of the soil outside the cloche can then moisten the dried soil under the cloche.

According to the invention there is provided a horticultural enclosure comprising a tubular frame, a cover of plastics material fitted on the frame, a plurality of slits in the cover, each slit defining a flap, the cover being tensioned by the frame such that the flaps are normally closed but such that they will be opened by the weight of rain on the cover to admit rain within the enclosure and opened when the enclosure is heated to admit air within the enclosure.

By the invention, therefore, a measure of automatic watering and ventilation of plants within the enclosure is obtained. When it rains the weight of the raindrops on the outside of the cover pushes open the flaps to admit a certain amount of rain within the enclosure. If the enclosure is heated, for example by the sun the flaps open to ventilate the enclosure. Opening of the flaps in this instance may take place due to the weight of condensed water on the inside of the cover. It may also result from a softening of the cover so that the tension in the cover is somewhat lowered and the flap opens under its own weight. The amount of rain, or air admitted in this way by an enclosure depends, inter alia, upon the number of flaps provided in the cover. It will be appreciated that the number of such flaps is largely a matter of choice depending, amongst other things, mainly upon the kinds of plants with which the enclosure is to be used, and the expected rainfall where the enclosure is to be used.

It is preferred embodiment of the invention the enclosure has the form of a tunnel defined by two walls and a roof. The flaps are provided in the roof. The pitch of the roof will also have an effect on the amounts of rain and air admitted through the flaps. The smaller the pitch the larger the amount of rain admitted and the more readily the flaps will open under the weight of condensed water. With a steeper pitch the converse happens. Thus when selecting the number of flaps to put in an enclosure regard may also need to be paid to the pitch of the roof. Generally the roof pitch is from 20° and 30° this being the roof angle which will provide maximum heating from received infra-red radiation. In an embodiment having a wall and roof additional ventilation can be obtained by providing apertures in the wall.

As is clear from the foregoing the cover must be tensioned over the frame such that the flaps open to admit rain water and to ventilate the interior and such that the flaps will close on other occasions. An advantageous way of achieving that, is for pockets to be provided in the cover into which the frame is received. In a preferred embodiment of the invention the frame comprises at least two hoops held apart by longitudinal frame members, pockets being provided at intervals on the cover, preferably in pairs, the pockets of each pair being located at opposite edges of the cover, into which the ends of the hoops are locatable. If desired further pockets may be provided on the cover to receive other parts of the frame, such as parts of the hoops intermediate the ends thereof and at least part of one or more of the longitudinal frame members.

The pockets for the frame are preferably formed by fixing strips of flexible material to the cover, as by welding, at intervals thereby defining the pockets. The material of the cover and pocket forming strips is preferably the same and most advantageously is clear polyvinyl chloride sheet. Not only can such material be welded readily, but it also has characteristics more similar to glass than other plastics sheet. Like glass, polyvinyl chloride sheet will retain infra-red radiation from the sun within the horticultural enclosure, this being the reason for increased temperature in a conventional glass covered frame or greenhouse, and the horticultural benefit achieved by enclosing plants. Plastics enclosures of other materials such as polyethylene sheet which does not retain infra-red radiation really only serve to protect plants from wind.

It is to be noted that the cover of the frame according to the invention must be flexible material and not of rigid material as in previously proposed kinds of frame. Only with flexible material can flaps be formed and the cover tensioned to produce the resultant automatic watering and ventilation provided by the present invention.

Specific embodiments of the invention will now be described by way of example with reference to the accompanying drawings in which:

FIG. 5 is a perspective view of another embodiment; and

FIG. 6 illustrates how the embodiment of FIG. 2 can be used to form a tunnel.

Figure 1:
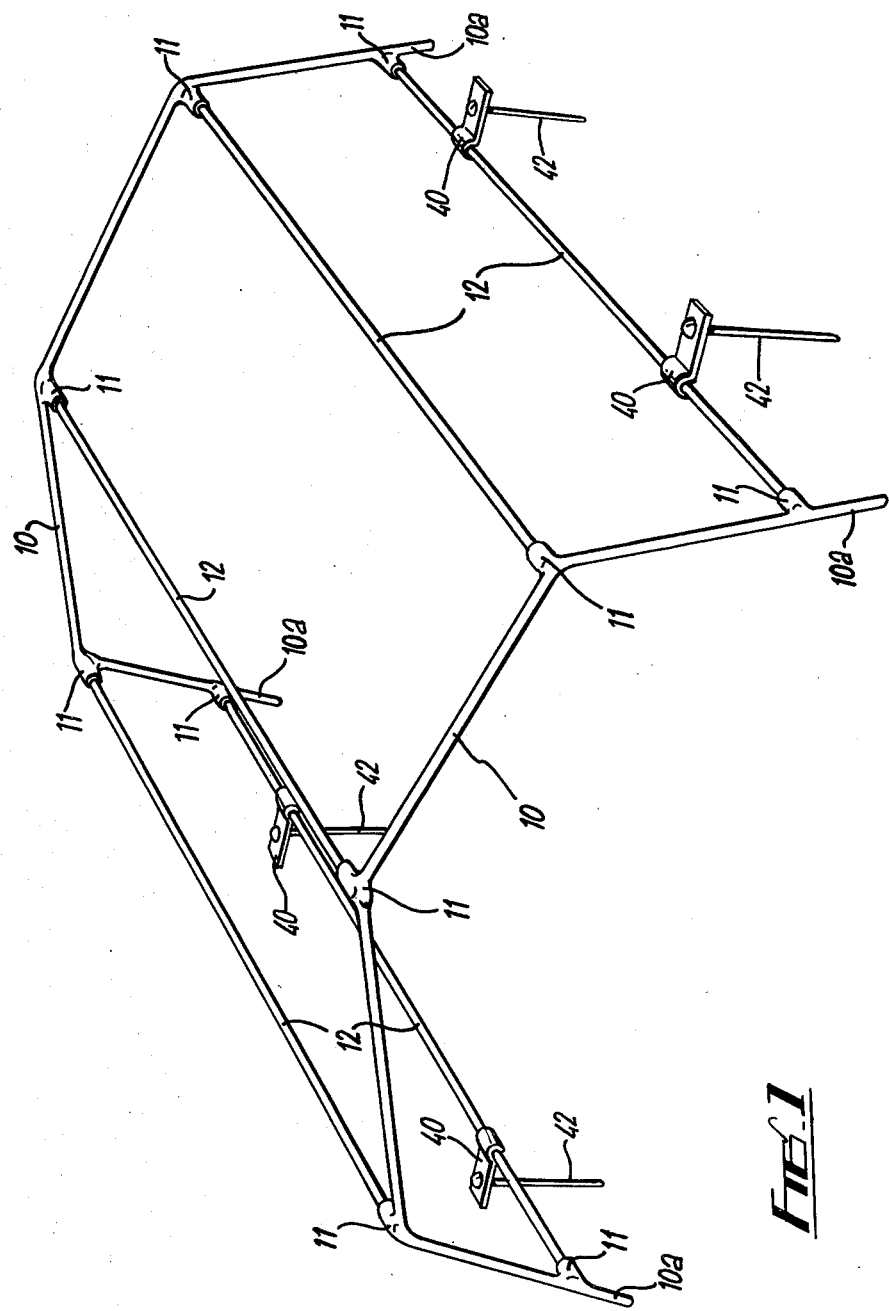
FIG. 1 is a perspective view of a frame.

Referring to FIG. 1 the frame for an enclosure in this case a cloche, is comprised of two hoops 10 made for example of rod or tube which may be of metal such as steel. The hoops 10 are held in spaced apart relationship by stretcher rods 12 the ends of which are received in sockets 11 on the hoops 10. The sockets are provided at the corners of the hoops and adjacent the ends so that when the rods are in position the frame defines a simple house-like shape but with projecting legs 10a.

Alternative methods of fixing the rods 12 to the hoops 10 can be used if desired. For example where the hoop is made of tube an aperture may be formed in the wall of the hoop into which one end a short length tube or rod is fitted leaving a part projecting from the hoops. The ends of rods 12 can then be fitted over the said projecting parts. When the hoop is made of solid rod, a recess is formed in the hoop to take the short length of tube or rod over the projecting part of which rod 12 is fitted. In another arrangement spigots which may be of plastics are fixed to the hoops and the rod ends are fitted over the spigots.

In the embodiment illustrated there are five rods 12. It will be understood that the number of rods can be increased or decreased as desired depending on the size of the enclosure and the shape of the hoops 10.

Figure 2:
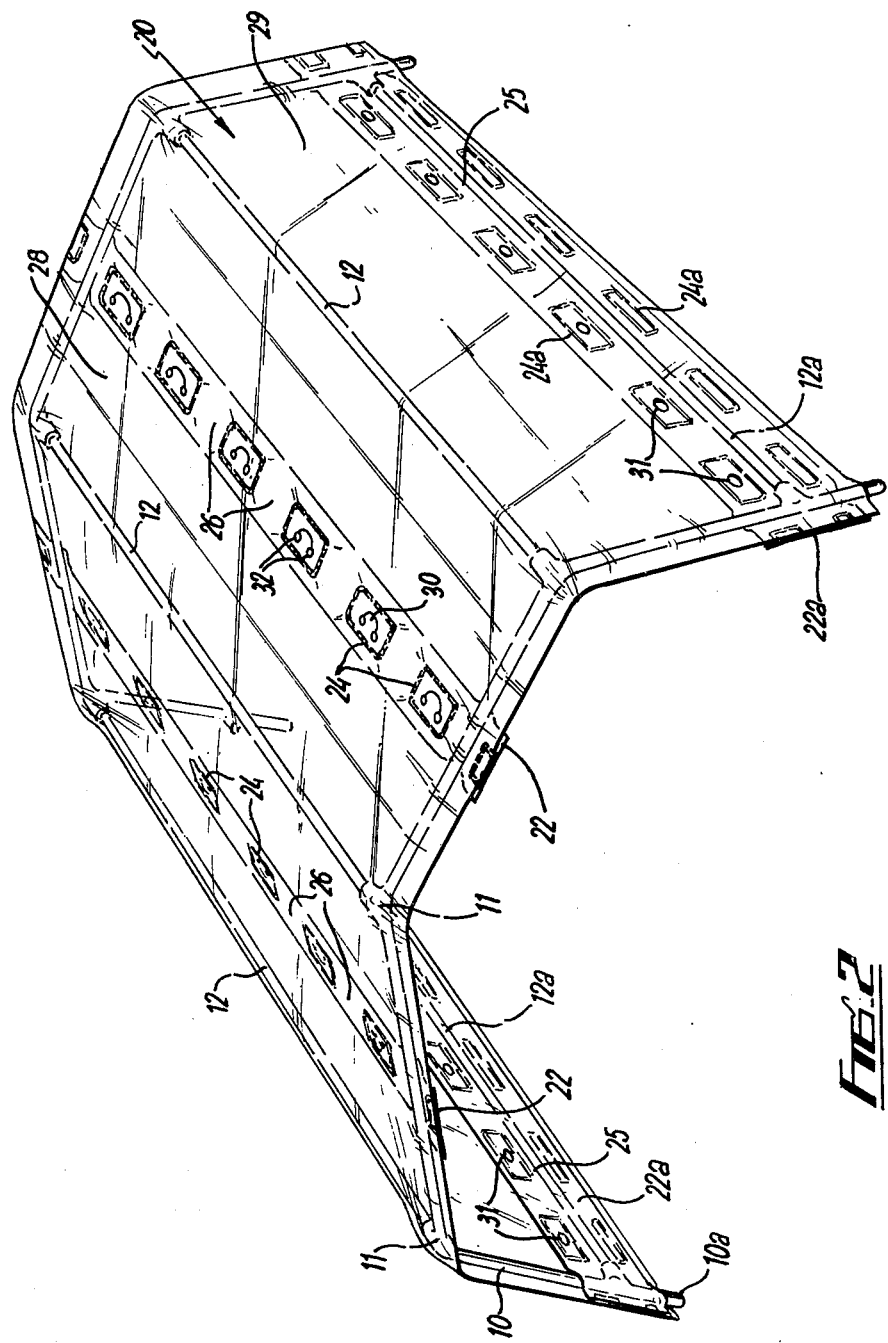
FIG. 2 shows the frame of FIG. 1 with a cover fitted thereon.

Referring now to FIG. 2, the cover for the enclosure comprises a flexible sheet of translucent plastics material 20, for example of polyvinyl chloride. A plurality of strips 22 of plastics, preferably the same plastics material as the cover 20, are fixed to one side of the cover parallel to each other and at spaced apart intervals. The strips 22 are fixed to the cover by high frequency welding around a plurality of rectangular areas 24 disposed at intervals along each strip. By this arrangement gaps or pockets 26 are defined between adjacent rectangular areas. Adjacent the edges of the cover the strips 22a about twice the width of strips 22 are provided. The strips 22a are secured by two rows of rectangular welds 24a so as to define a longitudinal pocket or channel 25 in addition to pockets 26.

The enclosure is assembled by threading the hoops through the pockets 26 and the edges of the cover and thereafter fitting the rods 12 in place. Rods 12a adjacent the ends of the hoops are threaded through the channels 25 in strips 22a prior to fitting said rods into their appropriate sockets 11. The dimensions of the frame parts and cover are chosen such that the cover is tensioned longitudinally and transversely. In particular, the appropriate longitudinal tension in the cover can be obtained by matching the rods 12 to the length of the cover. The transverse tension is obtained by appropriate positioning of the sockets 11 adjacent the free ends of the hoops relative to the strip 22a adjacent the edge of the cover. The whole assembly is held together by the tension in the cover, no fastening means being required for the frame parts.

As can be seen in FIG. 2 strips 22 are in the roof part 28 of the cover whereas the strips 22a are present in the walls 29. Flaps 30 are formed in the rectangular areas 24 in the strips 22 details of which will be described with reference to FIG. 3. Each flap is formed by two spaced apart apertures 32 interconnected by an arcuate slit 34 generally semicircular or horseshoe shaped. It is not essential for the flap to be of this shape; any suitable shape can be used.

It is essential to the invention that the tension in the cover should be such as to maintain the flaps 30 normally in the closed position. For example with a polyvinyl chloride cover of 150 microns thickness a pull of 40 lb. is appropriate. The flaps have dimensions such that when rainwater falls on the enclosure the weight of a raindrop on the flap will cause the flap to open and admit some rainwater. In addition the heating of the enclosure resulting in condensation of water vapour on the underside of a flap, and/or relaxation of the tension in the cover will cause the flap to open and admit air within the enclosure.

The number of flaps and their dimensions is to some extent dependent upon the plants to be covered by the enclosure and the expected rainfall and temperature variations in the place where the enclosure is to be used. For the cultivation of winter lettuces in the Midlands of the United Kingdom latitude 53°N; longitude 1°30'W; average annual rainfall 700 mm, a suitable arrangement included semiconductor flaps of diameter ⅜ inches with the ends of the diameter being centered on circular apertures 32 of diameter 7/32 inches. The centres of the strips 22 were 10 inches apart and the welded areas 24 in each strip were 6 inches from adjacent areas 24.

In one row of the welded areas 24a in each wall of the enclosure apertures 31 are provided which give permanent ventilation to the enclosure. Being in the wall, however, very little moisture in the form of rain passes through the apertures 31 except perhaps wind-driven rain. The apertures 31 are sized so as to provide with apertures 32, convected ventilation.

When the enclosure of FIG. 2 is in use it can be held in place by pushing the projecting legs 10a into the ground. Additional means for securing the enclosures comprise clips 40 (FIG. 1) adapted to engage the lower-most rod 12 and which are pivotally mounted on pins 42, which can be pushed into the ground. An enclosure held by such clips can easily be freed, to permit removal thereof to give access to plants, by pivotting the clips so as to disengage them from the rods 12. Once re-positioned the enclosure can be rapidly secured again. Alternatively the cloche can be held in place by resilient rings received on the lower-most rod 12 of the enclosure and which are looped over pegs driven into the ground, an arrangement similar to that now used with tents.

A plurality of enclosures of the invention, and particularly the embodiment of FIG. 2 can be fitted together, end to end, to form a "tunnel" as illustrated in FIG. 6. In order to hold the enclosures together clips 50 are provided which engage adjacent hoops 10. The clips may be as illustrated in FIG. 6 in the shape of two U-shaped channels joined together along one side.

Figure 3:
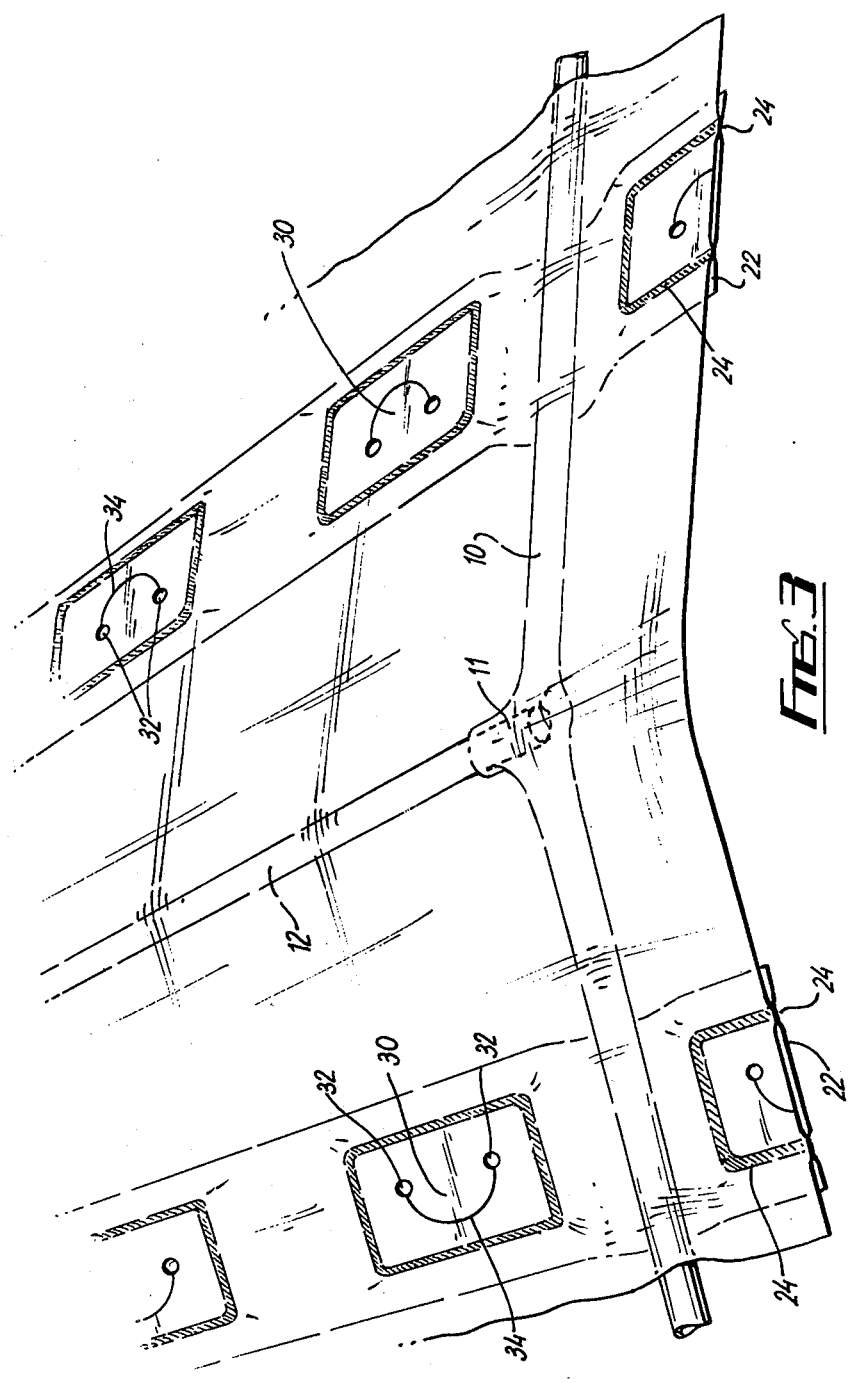
FIG. 3 is a part of the enclosure of FIG. 2 on an enlarged scale.

In order to limit ingress of moisture and draughts at the junctions between enclosures the cover at least at one end of each enclosure projects beyond the hoop as illustrated in FIG. 3. This projecting portion is tensioned over the adjacent hoop of the adjacent enclosures and then held in place by the clips 50.

Figure 4:
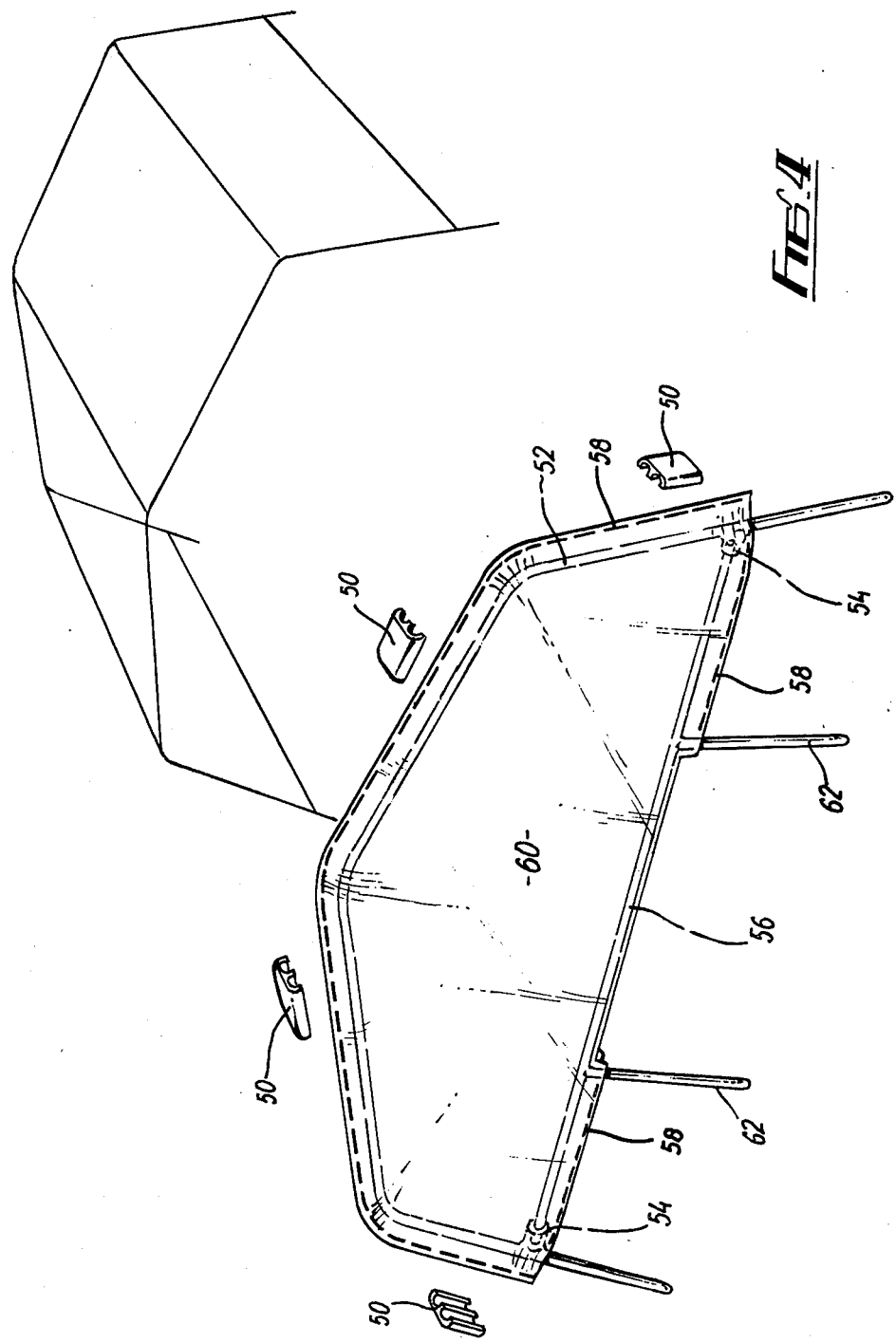
FIG. 4 is a perspective view of an end wall for use with the enclosure of FIG. 2.

The open ends of the enclosure, or tunnel formed by a plurality of enclosures, are closed by end covers one of which will now be described with reference to FIG. 4. The end cover comprises a hoop 52 which corresponds in shape to the hoop 10 of an enclosure. Inturned sockets 54, similar to sockets 11, are provided adjacent the free ends of the hoop. The sockets 11 are adapted to receive the ends of a rod 56. The frame thus defined is covered by a two-ply sheet of translucent plastics material 60 such as polyvinyl chloride which is welded along the edges thereof where indicated in dotted lines 58. The envelope thus formed as will be evident from FIG. 4 can be fitted around the frame.

The assembled end cover is held in place at the end of an enclosure by pushing the free ends of the hoop 52 into the ground. Additional legs 62 on the rod 56 can be provided and which, when pushed into the ground help to hold the end cover in place. Finally clips 50 connect the hoop 52 to the adjacent hoop 10 of the enclosure.

The shape and dimensions of enclosures according to the invention is not critical and can be adapted to suit particular requirements. The enclosure shaped as illustrated in FIG. 2 with slightly inwardly inclined walls and a roof pitch of about 20° has been found very useful as a cloche.

The invention can be applied to other kinds of horticultural enclosures such as a greenhouse, cold frame, propagator and the like. For example a simple cold frame construction is illustrated in FIG. 5. The cold frame consists of walls 70 assembled from four corner rods 72 equipped with elbow sockets 74 which receive the ends of wall rods 74. A lid 76 hinged to the rear top wall rod is formed from four rods 78 fitted into elbow sockets 80. The lid at least is covered with material having flaps such as is described with reference to FIG. 2. The walls may be similar to the walls of the enclosure of FIG. 2 and be provided with ventilating apertures only.

I claim:

1. A horticultural enclosure comprising a tubular frame, a cover of plastics material fitted on the frame, a plurality of slits in the cover, each slit defining a flap, the cover being tensioned by the frame such that the flaps are normally closed but such that they will be opened by the weight of rain on the cover to admit rain within the enclosure and opened when the enclosure is heated to admit air within the enclosure.

2. An enclosure as claimed in claim 1, having the form of a tunnel.

3. An enclosure as claimed in claim 1, comprising walls and an inclined roof.

4. An enclosure as claimed in claim 3, wherein the flaps are provided in the roof.

5. An enclosure as claimed in claim 3, wherein the roof has a pitch of from 20° to 30°.

6. An enclosure as claimed in claim 3, wherein ventilation apertures are provided in the walls.

7. An enclosure as claimed in claim 1, wherein pockets are provided on the cover, said pockets being adapted to receive parts of the frame therein.

8. An enclosure as claimed in claim 7, wherein strips of flexible material are fixed to the cover at intervals to define the pockets.

9. An enclosure as claimed in claim 8, wherein the strips are fixed to the cover by welding.

10. An enclosure as claimed in claim 8, wherein the strips are made of the same material as the cover.

11. An enclosure as claimed in claim 8, wherein the slits defining the flaps are formed in the cover where a strip is fixed thereto, said slits extending through the strip.

12. An enclosure as claimed in claim 1, wherein the frame comprises at least two hoops adapted to be held spaced apart by longitudinal frame members.

13. An enclosure as claimed in claim 12, wherein spigots are provided on the hoops to which the longitudinal frame members are connectable.

14. An enclosure as claimed in claim 12, wherein strips of flexible material are fixed to the cover at intervals to define pockets adapted to receive parts of the frame therein, at least one of said strips being fixed to the cover to define a longitudinal channel to receive a longitudinal frame member.

15. An enclosure as claimed in claim 1, wherein the cover is of polyvinyl chloride sheet.

16. An enclosure as claimed in claim 1, wherein the cover is translucent.

17. An enclosure as claimed in claim 1, wherein the slits defining the flaps are arcuate.

* * * * *